Jan. 22, 1963   R. M. SACCO   3,074,211
GRINDING WHEEL
Filed Aug. 24, 1960

INVENTOR.
ROBERT M. SACCO
BY

United States Patent Office 3,074,211
Patented Jan. 22, 1963

3,074,211
GRINDING WHEEL
Robert M. Sacco, Hudson, Mass., assignor to Norton Company, Worcester, Mass., a corporation of Massachusetts
Filed Aug. 24, 1960, Ser. No. 51,663
3 Claims. (Cl. 51—206)

This invention relates to grinding wheels and has for its principal objects to provide a wheel of the kind having a relatively thin facing of diamond containing abrasive, supported by and bonded to a preformed center mount of non-abrasive material; which center is dense and strong enough to withstand high compressive pressures without failing, during use as well as during manufacture, as when the abrasive facing is being applied to the center; to provide a wheel which can be subjected to relatively high temperatures during manufacture and use without distortion or blistering; which will not be brittle; which can be machined easily; and which has a good appearance. Other objects are to provide a wheel with readily available equipment and materials at a satisfactory cost.

As herein illustrated, the grinding wheel has a grinding face and a preformed center mounting comprised of a volatileless resin and filler mixture which are substantially non-porous, the finished center having a maximum density for the given mixture and being able to withstand compressive pressures of from 5 to as high as 18 tons per square inch. The wheel structure can be heated to a relatively high temperature without distortion or blistering. The resin contains a particulate filler wherein preferably the resin is powdered epoxy novolac system and the filler is powdered aluminum.

In accordance with the present invention, a mixture of volatileless resin and a filler may be either hot or cold pressed with or without a plasticizer in a mold to make a preform center of suitable size. The preform is then cured. A mixture of abrasive and binder is pressed about the preform in a proper mold to form and partially cure a resin and abrasive facing thereon and the composite wheel is then subjected to a final curing procedure while unconstrained. When hot pressing, the mixture constituting the preform is partially cured at a pressure of about 5 tons per square inch and is then fully cured in a conventional manner. The abrasive facing is thereafter pressed about the preform and partially cured while under pressure to bond the facing to the preform and then the composite wheel is subjected to a further processing to fully cure the facing. Cold pressing may be carried out at 5 tons per square inch; however, presures of 6.5 to 7.5 tons per square inch are preferred in order to ensure production of a preformed center having a maximum density. If liquid plasticizer is used it must be of the kind that will combine with the resin during curing without the evolution of volatiles.

The invention will now be described in greater detail with reference to the accompanying drawings wherein.

Figure 1:
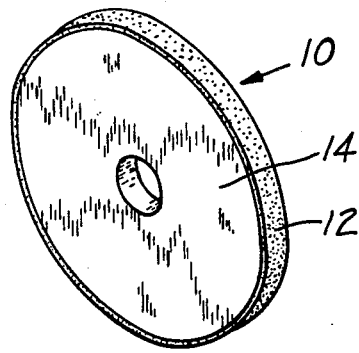
FIG. 1 is a perspective view of the finished grinding wheel.

Referring to the drawings (FIG. 1), the grinding wheel 10, as herein shown, has an abrasive facing or rim 12 and a non-abrasive center support or hub 14. The facing or rim 12 is comprised of diamond containing abrasive bonded with a resin. The center support 14 is comprised of a resin and filler, the resin in the center and forming the abrasive bond embodying characteristics which contribute both to the manufacture of the wheel and to the attainment of the physical properties desired in the finished wheel.

In accordance with the preferred method of manufacture, the center support 14 is first preformed of a mixture of powdered resin and a powdered filler by pressure and heat to form a cured compact, hereinafter referred to as the "preform." Next a mixture of powdered abrasive and binder is pressed about the periphery of the preform and partially cured. Finally the composite wheel including the abrasive mixture is fully cured.

Figure 2:
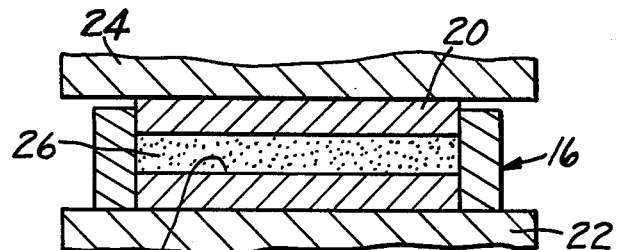
FIG. 2 is a section of a mold and press employed in performing the first step of preforming the center for the grinding wheel.
Figure 3:
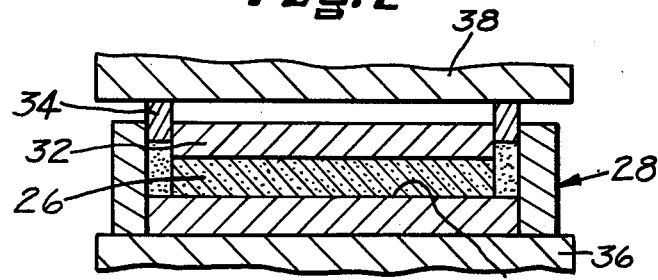
FIG. 3 is a section of a mold and press for applying the grinding face to the preformed center of the grinding wheel.
Figure 4:
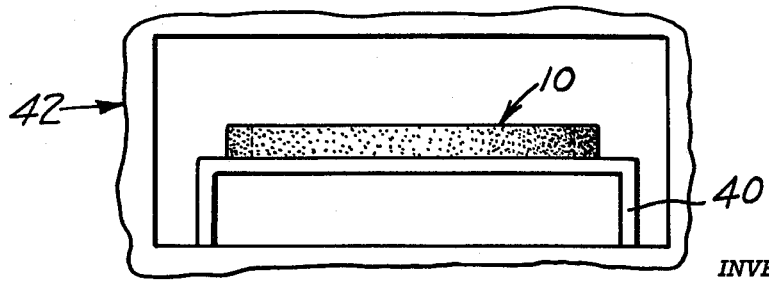
FIG. 4 is a section through an oven showing the composite wheel disposed therein for curing.

The general procedure to be followed for carrying out the method of manufacture, according to this invention, is to place a quantity of a mixture of a powdered resin which will cure without the evolution of volatiles and a powdered filler, in suitable proportions, according to the physical properties specified for the wheel to be made, into a mold 16, such as shown in FIG. 2, having a circular cavity 18 of the desired diameter and depth. A cover 20 is placed over the mixture so as to close the cavity and pressure is applied, for example, by relatively movable plungers 22 and 24. The mold is warmed up from room temperature to a temperature which will effect heating of the mixture and then pressure is applied of sufficient intensity to attain maximum density for a sufficient length of time to produce a partially press cured preform which will not slump in the succeeding oven curing operation unconstrained.

The fully cured preform is placed centrally within a second mold 28 containing a cavity 30 of larger size, the inside diameter of which mold corresponds to the diameter of the wheel to be made, so that there is an annular space surrounding the preform which has a radial thickness corresponding to the thickness of the facing which is to be applied to the preform. A cover 32 is placed over the preform and then a suitable mixture of abrasive grits and a powdered resin binder (phenol formaldehyde) is poured into the annular space about the preform. A ring 34 is placed about the cover over the abrasive mixture and is pressed downwardly so as to compact the mixture to the same thickness as the preform, for example, by relatively movable plungers 36 and 38. The mold is now heated so as to partially cure the resin in the abrasive mixture and to cause the abrasive to become integrally bonded to the periphery of the already cured preform.

The composite wheel structure is then stripped from the mold 28 and is placed on a suitable support 40 in an oven 42 for final curing of the abrasive mixture. This curing is effected by raising the temperature gradually to the top curing temperature which may be 140 to 225° C. The wheel is not constrained or otherwise held under pressure during the curing cycle in oven 42 and the temperature and periods of time for effecting curing will, of course, vary with the physical dimension of the wheel being made and the proportions of the constituents making up the wheel.

The preferred resin for making the preform is a mechanical blend of epoxylated phenol novolac with diamino diphenyl sulfone. The resin cures to form a strong non-porous structure of maximum density at a pressure of about 5 tons per square inch without the evolution of volatiles. The non-porous character of the structure obtained by the use of epoxylated novolac resin is due to the fact that the epoxylated novolac is one of the resins which has a molecular structure that cures by addition as distinguished from condensation. In addition reactions no volatile by-products are given off. Because of this structure no volatile is involved during the curing of the resin and hence no pores are produced within the center of the preform during the curing and a non-porous, completely dense product can be produced.

Although epoxylated novolac resin together with its conventional hardener is preferred for making the preforms according to this invention, it is only one example of a number of compounds which can be employed for this purpose, which embody the characteristics of curing by addition as distinguished from condensation and hence without the evolution of gas. Other volatileless resins are certain types of polyesters, and polyisocyanate.

The epoxylated novolac used herein for the manufacture of the preform is a dry powder and is used in proportion of 1 part of resin to 9 parts by weight of the filler; however, the resin may be present in an amount of from 2% to as much as 50%. In some instances there may be more resin than filler. A resin particle size of 200 mesh is found to be desirable when that of the filler is 320 mesh.

The preferred filler is aluminum powder and is typically employed in the mixture in the proportions of 9 parts of aluminum to 1 part of the resin, but, as previously indicated, these proportions may be varied considerably according to the characteristics desired in the finished product. Aluminum powder is used herein which has a dendritic (irregular) structure, although nodular particles may be used. The particle size may range from No. 100 to No. 1500 mesh; however, that preferred is No. 320.

Other metallic fillers may be employed such as iron, tin, and the like, and also certain non-metallic fillers, for example, silica.

In making up the mixture of powdered resin and powdered metal, the properly proportioned powders are drum rolled for blending, although other kinds of apparatus for blending may be employed such as the Norton vertical spindle-type mixer.

In the formation of the preform in the mold, as described above, an initial pressure of about 1 ton per square inch is employed during the warm-up period, the latter being in the order of 3 to 5 minutes. The temperature is raised during the warm-up period from room temperature to a temperature of about 140° to 160° C. At this temperature the pressure is increased to a minimum of 5 tons per square inch and partial curing is effected while the mixture is subjected to this pressure for a period of about 25 to 30 minutes. It is to be understood, however, that the pressures, temperatures, and time may be varied depending upon the size of the preform and the proportion of its mixture to insure maximum density and to prevent slump in the succeeding final curing. Thus, for example, pressures of up to 10 tons per square inch have been tried; however, the optimum pressure appears to be 5 tons per square inch.

The preform is designed to be essentially non-porous and is fully cured prior to completion of the wheel structure. The cured preform is now adapted to have an abrasive surface bonded thereto.

Bonding of the abrasive facing to the preform is effected under a pressure sufficient to reduce the abrasive mixture to the same thickness as that of the preform and for a sufficient length of time to partially cure the resin and bond the mixture to the preform. The heating cycle for completely curing the composite wheel, after the facing has been bonded to the preform is a conventional resin bonding technique and is effected by raising the temperature of the wheel gradually from room temperature to approximately 140° C. to 225° C. and holding the temperature to completely cure the resin bond for the abrasive.

The following are specific examples of the procedure making the preform center compact and the physical properties exhibited thereby:

EXAMPLE 1

Powdered aluminum and powdered epoxylated novolac were weighed out and mixed in the ratio of 9 parts of aluminum to 1 part of resin in a sufficient amount to make a sample 6 inches in diameter and 1 inch thick. The mixture was placed in a mold, as previously described, and the mold cover was closed under a pressure of 5 tons per square inch. Heat was supplied to the press for 25 minutes at a temperature of 160° C., whereupon the piece was removed and allowed to cool at room temperature. The weight per unit volume, thickness and width measurements were then taken. The partially cured center was placed in the curing oven and subjected to a conventional heating cycle for a period of 32 hours. On completing this curing cycle the fully cured piece was removed from the oven and allowed to cool and the weight per unit volume, thickness and diametrical measurements were again taken. At a hot-press pressure of 5 tons per square inch for 25 minutes, the epoxylated novolac showed no loss in weight per unit volume as a result of the final curing cycle. Its Rockwell hardness had a value of 100 on the $R_L$ scale and there was no weight change in the piece. There was noted a shrinkage of about 3 mils in the diameter upon completion of the final cure. The thickness showed no apparent change. Under the pressure of 5 tons per square inch the piece attained a maximum density of about 2.41 and stood up under a pressure as high as 18 tons per square inch utilized to mold the abrasive mixture thereto. The wheel produced in following this teaching did not blister or distort when subjected to a temperature of as high as 225° C.

EXAMPLE 2

The procedure described in Example 1 was repeated in all respects except for the molding pressure used, which was increased to 7.5 tons per square inch.

The results were the same as the preform effected at 5 tons per square inch, to wit, there was no change in the total weight per unit volume, the piece had the same Rockwell hardness and the same values for shrinkage in diameter and thickness.

EXAMPLE 3

Powdered epoxylated novolac and powdered aluminum were mixed in the ratio of 2 parts of resin to 98 parts of aluminum in sufficient amount to make a sample 6 inches in diameter and 1 inch thick.

With this mixture the procedure followed in Example 1 was carried out using a pressure of 7.5 tons per square inch. The resulting piece exhibited no weight change, no change in diameter and no change in thickness.

EXAMPLE 4

The procedure outlined in Example 1 was carried out with a mixture comprised of 5 parts of resin to 95 parts of aluminum at a pressure of 7.5 tons per square inch. The resulting piece exhibited no weight change, no change in diameter and no change in thickness.

EXAMPLE 5

The procedure outlined in Example 1 was carried out with a mixture containing resin and aluminum in the ratio of 15 parts of resin to 85 parts of aluminum at 7.5 tons per square inch. The cured piece exhibited no change in weight, no change in diameter and no change in thickness.

EXAMPLE 6

The procedure outlined in Example 1 was repeated with a ratio of 25 parts of resin to 75 parts of aluminum. The cured center exhibited no change in weight, no change in diameter and no change in thickness.

Hot-molding pressures up to 10 tons per square inch were tried with various preform mixtures and it was found, as illustrated by the foregoing examples, that the optimum properties are obtained at approximately 5 tons per square inch and that pressures up to 10 tons per square inch do not appreciably improve the properties over those obtained at the lower pressure.

The cured non-porous preform produced according to the method described will withstand molding pressures for the purpose of applying the abrasive or facing of 5 to 18 tons per square inch; will withstand temperatures in use and during baking without blistering up to 225° C.; is volatileless during curing; is dimensionally stable, that is, changes little in thickness or diameter; is readily machinable; and has a good appearance.

Table I shows the physical properties of a 1 to 9 mixture at pressures for 2.5 to 10 tons per square inch.

*Table I—Hot Pressed*

| | | | | | | |
|---|---|---|---|---|---|---|
| Molding pressures TSI | 2.50 | 3.00 | 4.00 | 5.00 | 7.5 | 10.00 |
| Density, gms/cc. before bake | 2.16 | 2.21 | 2.32 | 2.40 | 2.41 | 2.41 |
| Density gms./cc. after bake | 2.16 | 2.21 | 2.32 | 2.40 | 2.41 | 2.41 |
| Rockwell hardness RL | 76 | 80 | 92 | 100 | 100 | 99 |
| Weight change during baking, gms./1,000 gms | 0 | 0 | 0 | 0 | 0 | 0 |
| Volume change during baking, cc./500 cc | 0 | 0 | 0 | 0 | 0 | 0 |
| Diameter change during baking, mils/6" | 0 | −1 | −2 | −3 | −3 | −5 |
| Thickness change during baking, mils/1" | −1 | 0 | 0 | 0 | 0 | 0 |

An inspection of the data set forth above shows that cured preforms hot-pressed at about 5 tons per square inch and higher and having a composition of 1 to 9 resin to aluminum filler, have a maximum density and are found to be non-porous. This is essential to my invention and the preforms having a density of under about 2.40 with this mixture will not stand up when an attempt is made to mold and cure the abrasive facing on the surface of the preform.

As described above and as illustrated in the preferred examples, the cured center preform is made by hot pressing a mixture of powdered resin and aluminum in the ratio of 1 to 9 at a minimum pressure of 5 tons per square inch for a period of approximately 20 to 25 minutes. Alternatively, the preform may be formed by cold pressing with or without a plasticizer. After preforming and curing the center at approximately room temperature and under pressure as described above, a non-porous center results. A facing ring of abrasive may then be applied to the formed center, as previously described, and the composite wheel is cured by placing it in an oven and subjecting it to a conventional heating cycle to bond the abrasive ring to the center.

The preform made according to this invention may be provided with a center hole for mounting on an arbor, either when molding or subsequently by machining.

It should be understood that the present disclosure is for the purpose of illustration only and that this invention includes all modifications and equivalents which fall within the scope of the appended claims.

I claim:

1. In a grinding wheel, a grinding face, and a preformed mounting to which the grinding face is bonded, said preformed mounting being formed of a cured volatileless resin and a particulate filler which cures to form a non-porous resin bond for the particulate filler, and said preformed mounting being of the maximum possible density for the resin and filler mixture.

2. In a grinding wheel, in accordance with claim 1, wherein the resin is of the group of resins which cure by addition.

3. In a grinding wheel, a grinding face, and a preformed mounting to which the grinding face is bonded, said preformed mounting being comprised of a cured epoxy novolac resin and powdered aluminum in the proportions of 1 part resin to 9 parts by weight of aluminum, said mounting having a density of 2.40.

References Cited in the file of this patent

UNITED STATES PATENTS 2,150,886   Van Der Pyl _____ Mar. 14, 1939
2,779,668   Daniels et al. _____ Jan. 29, 1957